Jan. 8, 1946.   R. A. LAVOTA   2,392,596
LATHE ATTACHMENT
Filed Feb. 17, 1944   4 Sheets-Sheet 1

Inventor

Rudolph A. Lavota

By Clarence A. O'Brien
and Harvey B. Jacobson
Attorneys

Jan. 8, 1946.  R. A. LAVOTA  2,392,596
LATHE ATTACHMENT
Filed Feb. 17, 1944  4 Sheets-Sheet 2

Inventor
Rudolph A. Lavota
By Clarence A. O'Brien
and Harvey B. Jacobson
Attorneys

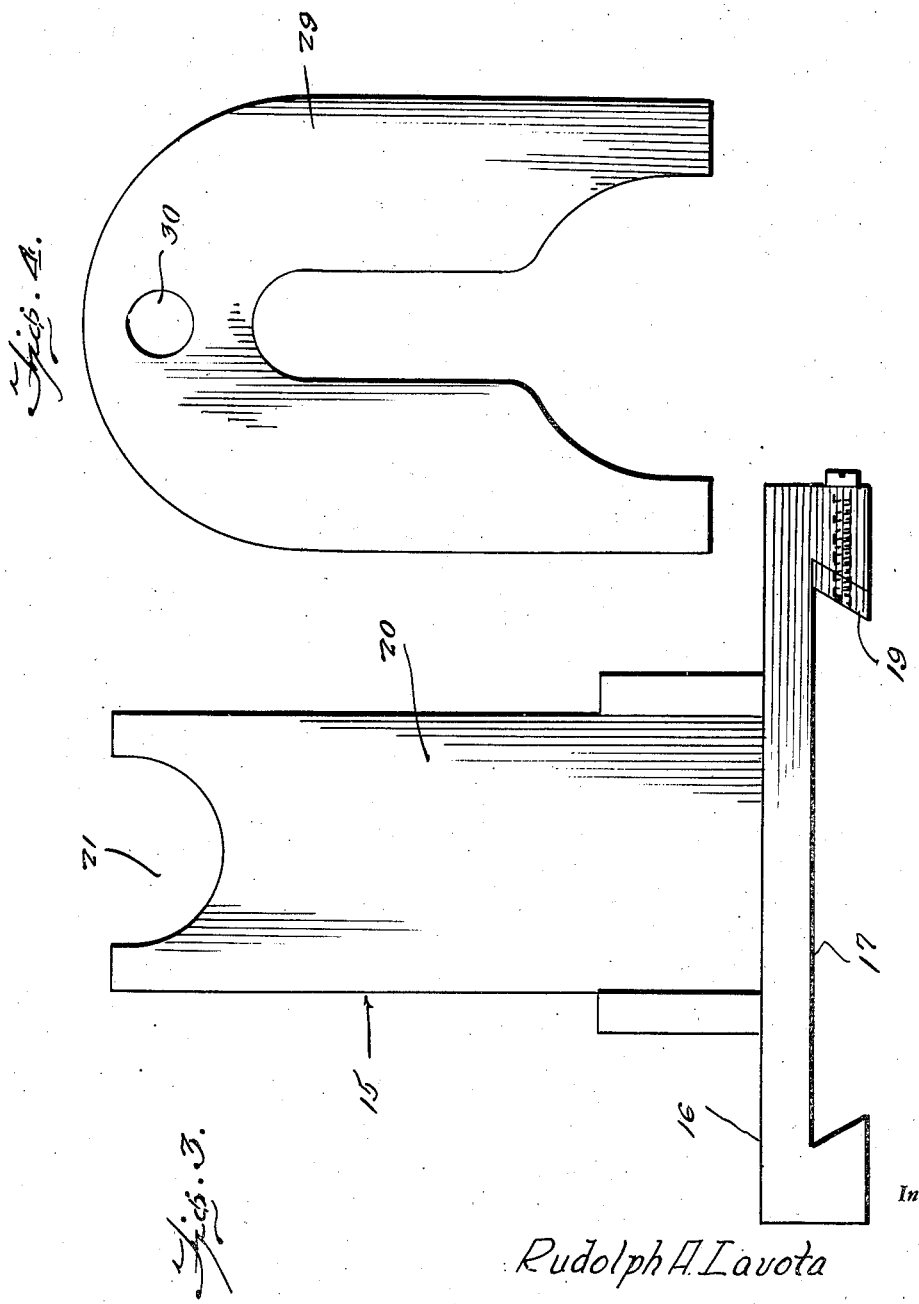

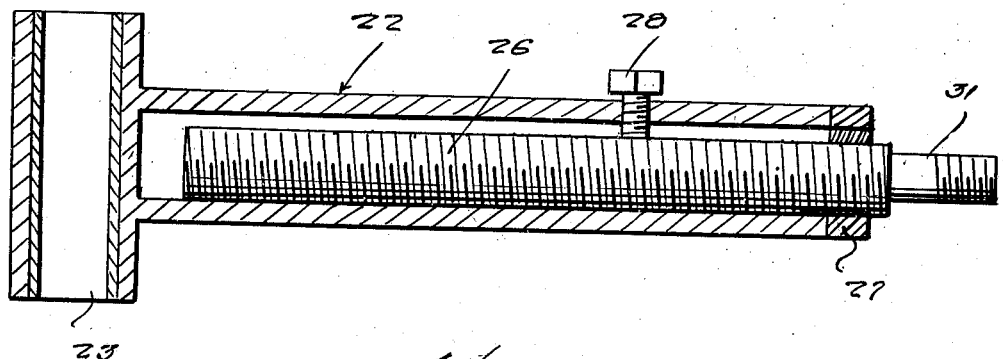
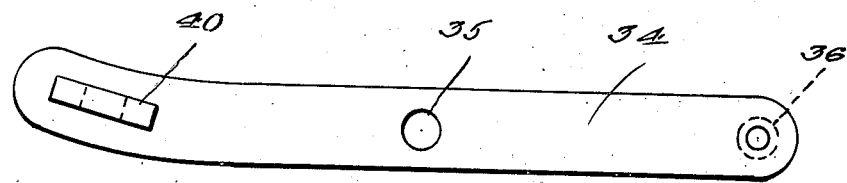
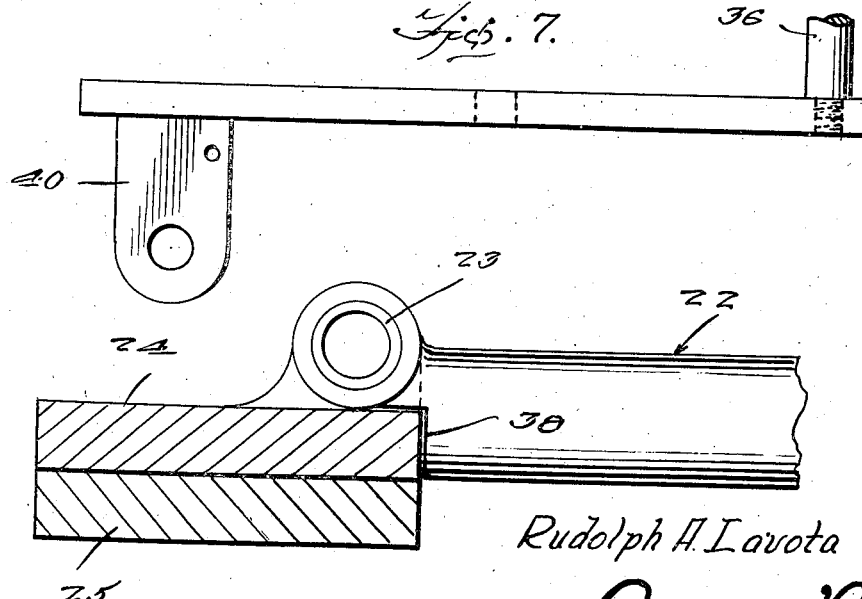

Patented Jan. 8, 1946

2,392,596

UNITED STATES PATENT OFFICE 2,392,596

LATHE ATTACHMENT

Rudolph A. Lavota, Milwaukee, Wis.

Application February 17, 1944, Serial No. 522,835

5 Claims. (Cl. 10—143)

This invention relates to lathe attachments, and particularly to an attachment for a lathe employing a collapsible tap for threading work held in the chuck unit of the lathe.

The primary object of the present invention is to provide an attachment of the above kind by means of which the tap will be automatically collapsed at the end of each threading operation to permit withdrawal of the tap from the work, and by means of which the tap is automatically expanded upon being withdrawn from the work so that the tap is automatically conditioned for performing the next succeeding threading operation.

A more specific object of the present invention is to provide an attachment of the above kind and for the purpose specified, which is comparatively simple in construction, highly efficient in use, and readily applicable to existing conventional lathes.

Other and more specific objects and features of the present invention will become apparent from the following description when considered in connection with the accompanying drawings, and the invention consists in the novel form, combination and arrangement of parts hereinafter more fully described, shown in the accompanying drawings and claimed.

In the drawings, wherein like reference characters indicate corresponding parts throughout the several views:

Figure 3 is an enlarged elevational view of the abutment employed for automatically expanding the tap upon withdrawal of the latter from the work.

Figure 4 is an enlarged elevational view of the forked abutment member employed to automatically collapse the tap upon completion of each threading operation.

Figure 5 is an enlarged central longitudinal sectional view of the adjustable swinging arm which carries the abutment member shown in Figure 4.

Figure 6 is an enlarged side elevational view of the lever forming part of the means for elevating the abutment member of Figure 4 upon withdrawal of the tap from the work whereby said abutment member will be moved out of the way to permit withdrawal of the threaded work from the chuck unit of the lathe.

Figure 7 is an edge elevational view of the device shown in Figure 6, and

Figure 8 is an enlarged fragmentary view partly in section and partly in side elevation, showing an end portion of the arm illustrated in Figure 5 and the mounting therefor.

Figure 1:
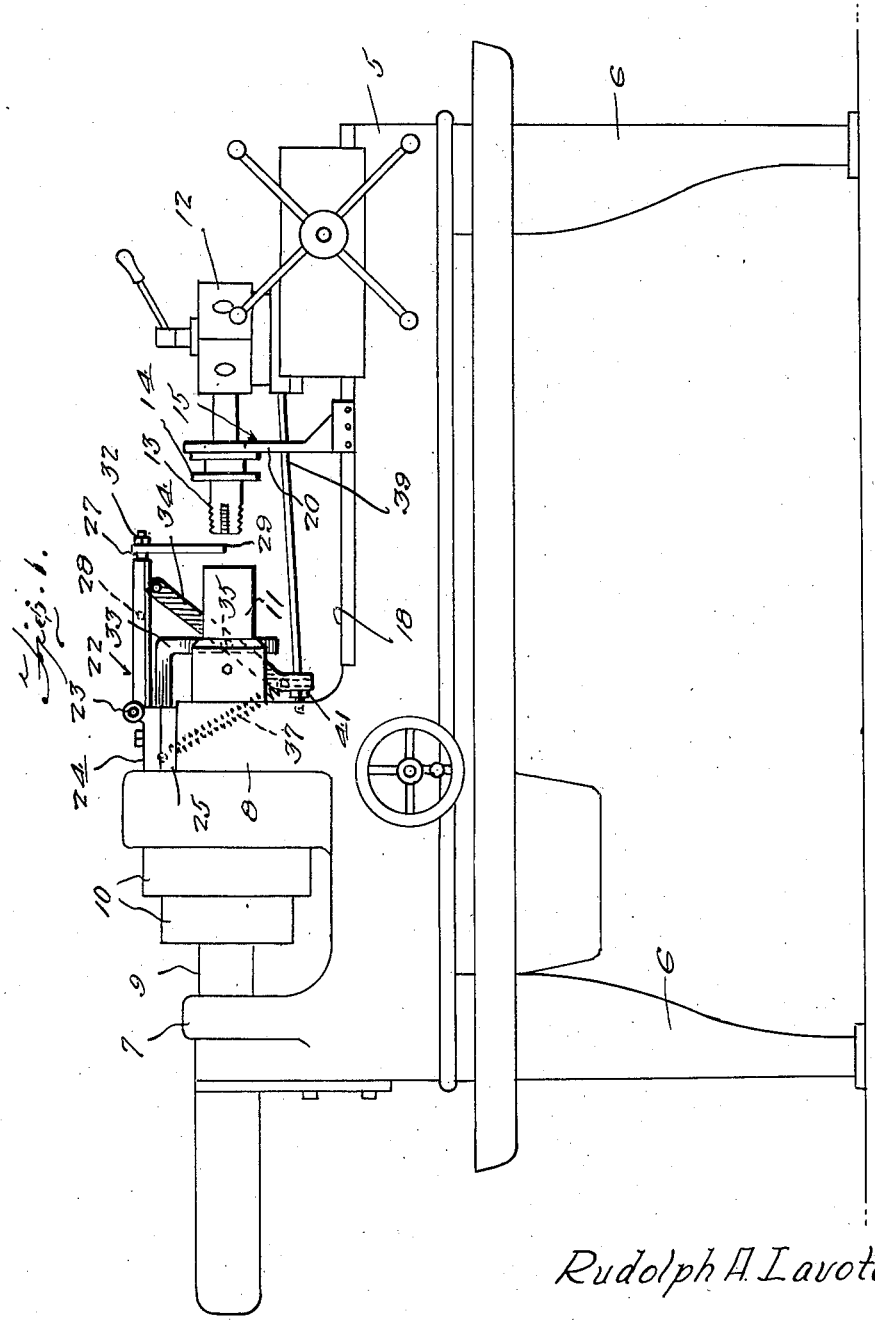
Figure 1 is a side elevational view of a lathe equipped with an attachment constructed in accordance with the present invention.
Figure 2:
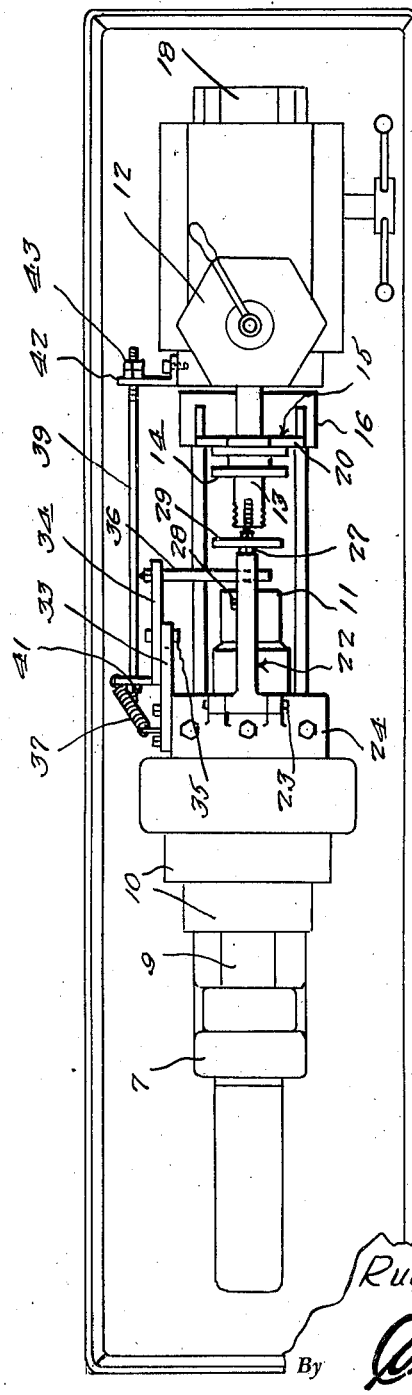
Figure 2 is a top plan view thereof.

Referring in detail to the drawings, the present invention is illustrated as applied to a turret lathe of conventional construction including a bed 5 mounted on supporting legs 6 and having spaced outer and inner bearings 7 and 8 on one end in which is journaled the spindle 9 having driving pulleys 10. The usual chuck unit 11 is provided on the spindle at the inner side of the inner bearing 8. The tool holder of the lathe illustrated consists of a turret 12 which is operated by conventional mechanism to feed it toward and away from the chuck unit 11 and thereby feed the tool to the work and withdraw said tool from the work. The present invention or attachment is essentially designed for use in connection with a lathe employing a collapsible tap 13 for threading work placed in the chuck unit 11, said tap 13 being mounted in the tool holder or turret 12 and being of the type embodying an externally flanged actuator 14 which is shifted to the right of Figure 1 for collapsing the tap and permitting its removal from the work at the completion of each threading operation, and which is shiftable to the left of Figure 1 to expand the tap and condition it for the next succeeding threading or tapping operation. The elements and construction thus far described are conventional and well known in the art, and the tap is of the type shown in the U. S. Patent to G. H. Burley, No. 804,928, the element 22, 23 of the patent corresponding to the actuator 14 herein. Another tap suitable for use in this invention is available on the market and is known as the "Murchey self-opening and closing tap."

In accordance with the present invention, an abutment, generally indicated at 15, is mounted upon the bed 5 in position to be engaged by the actuator 14 so as to shift the latter to the left of Figure 1 and cause expansion of the tap 13 when the tool holder or turret 12 has moved to completely withdraw the tap 13 from the work. As shown, this abutment consists of a base plate 16 having an undercut groove 17 in the bottom thereof to fit the longitudinal dovetailed rib 18 provided on the bed 5 of the lathe, means including a gib 19 being provided to secure the base plate 16 in the desired position longitudinally of the bed so that the abutment 15 will actuate the tap 13 at the proper time. In other words, the abutment 15 is adjustable longitudinally of the bed 5 so that it may be set and secured in proper position, and said abutment further includes an upright plate 20 fixed on and rising from the base plate 16 and bifurcated at its upper end, as at 21, so as to partially embrace the shank of tap 13 and project in the path of the adjacent flange of actuator 14.

The present attachment further includes a vertically swinging arm 22 which is adjustable in length and pivotally mounted at one end, as at 23, on a plate 24 fixed to the cap 25 of lathe bearing 8. The arm 22 is thus mounted for vertical swinging movement so as to project toward the tap 13 and beyond the free end of chuck unit 11, as shown clearly in Figures 1 and 2. As shown in Figure 5, the arm 22 consists of telescopic sections, the outer one being pivoted at 23, and the inner section 26 consisting of a threaded rod having a nut 27 threaded thereon at the outer end of the outer section. Also, the rod 26 is flattened at one side and is engaged at this side by a set screw 28 threaded through the outer section of the arm 22, so that the rod 26 is restrained from rotation. Thus, by adjusting the nut 27, the inner section 26 of the arm 22 may be adjusted longitudinally of said outer section of arm 22. The adjustment may be secured by tightening the set screw 28. Mounted on the outer end of the inner arm section 26 is a bifurcated abutment member 29 which depends in position to straddle the tap 13 and lie in the path of the actuator 14, so that when the tap has entered the work sufficiently to complete the threading or tapping operation, said abutment member 29 will have engaged the adjacent flange of actuator 14 and shifted the latter to the right of Figure 1 to effect collapsing of the tap 13. This permits the withdrawal of tap 13 when the tool holder or turret 12 is subsequently automatically withdrawn from the work by means of the automatic mechanism of the lathe. Obviously, the adjustment of the arm 22 positions the abutment member 29 in the proper location according to the depth of the work and the distance at which the tap 13 is adapted to enter the work for the particular threading operation being done. As shown, the abutment member 29 has an opening 30 at the top which receives the reduced outer end portion 31 of the arm section 26, a nut 32 being threaded on the reduced end 31 of section 26 to secure the abutment member 29 thereon. Attached to the plate 24 is an angular bracket 33 having an arm depending at one side of the chuck unit 11 to which is pivoted a lever 34, as at 35. The lever 34 is pivoted intermediate its ends, and has a laterally projecting pin 36 at its upper end extending transversely beneath the arm 22. A helical tension spring 37 is attached at one end to plate 24 and at its other end to the lower arm of lever 34 so as to normally swing the latter to a position wherein the arm 22 is permitted to lower to operative position with respect to actuator 14 of tap 13, as shown in Figure 1, it being understood that the downward swinging movement of arm 22 is limited to a horizontal position by reason of the pivotal mounting thereof. This is illustrated in Figure 8 wherein the arm 22 is arranged to abut the plate 24, as at 38, when in its downwardly swung horizontal position. A rod 39 connects the lower arm of lever 34 with the tool holder or turret 12, the arrangement being such that when said tool holder or turret is moved to withdraw the tap 13 from the work, the lever 34 is caused to swing against the action of spring 37 so as to elevate arm 22 and thereby raise the abutment member 29 out of the way to permit convenient removal of the work from the chuck unit 11. The arrangement is further such that as the tool holder or turret 12 is fed to the work, the lever 34 is permitted to swing under the influence of spring 37 in a direction to allow the arm 22 to lower for positioning the abutment member 29 in the path of the actuator 14 so that the latter will be shifted to collapse the tap 13 upon completion of the threading or tapping operation. As shown in Figures 1, 2, 6 and 7, the lever 34 has a lateral ear 40 through which one end of rod 39 slidably extends, said end of rod 39 being retained in the ear 40 by means of a nut 41 threaded on the rod 39. A bracket 42 is fixed to one side of the tool holder or turret 12 and has the other end of rod 39 extended therethrough, nuts 43 being threaded on this end of rod 39 and retaining the rod 39 connected to the bracket 42. Adjustment of nuts 43 can be had for varying the length of the portion of the rod 39 between the ear 40 and bracket 42 so that arm 22 will be permitted to completely lower when the tap is fed to the work and will be caused to move upwardly a proper distance when the tap is withdrawn from the work.

From the foregoing description, it is believed that the construction and operation, as well as the advantages of the present invention, will be readily understood and appreciated by those skilled in the art. Upon shifting of turret 12 to the right of Figure 1 to effect complete withdrawal of tap 13 from the work and the chuck unit 11 in which the work is held, the abutment 15 will have engaged the actuator 14 and shifted it to the left of said figure so as to cause expansion of tap 13 and thereby to condition the latter for the threading operation. When this occurs, a pull is exerted on rod 39 to swing lever 34 and elevate arm 22 so as to raise abutment member 29 out of the way and permit ready insertion of work in the chuck unit 11. The feed mechanism of the lathe then shifts the turret 12 so as to feed the tap 13 to the work in the chuck unit 11, thereby moving rod 39 and swinging lever 34 so as to permit arm 22 and abutment member 29 to lower. When the tap has completed the threading operation, the abutment 29 will have engaged the actuator 13 and shifted the latter so as to collapse the tap 13, thereby permitting withdrawal of the latter from the work upon the subsequent movement of turret 12 to withdraw the tap 13 from the work. When the turret 12 is thus moved to withdraw the tap from the work, a pull is exerted on rod 39 so as to swing lever 34 and elevate arm 22 and abutment 29, thereby raising the abutment 29 to an out-of-the-way position so that the work may be readily removed from the chuck unit 11. This cycle of operation is repeated as long as the threading of work is continued.

While I have shown and described herein a preferred embodiment of the invention, it will of course be understood that minor changes in details of construction illustrated and described may be made such as fairly fall within the spirit and scope of the invention as claimed.

What I claim as new is:

1. In combination with a lathe having a power-driven rotary chuck unit and provided with a tool holder mounting a collapsible tap having an actuator and fed to and from the chuck unit for entering the tap into and withdrawing the tap from the work, an abutment mounted on the bed of the lathe and disposed in the path of the tap actuator for expanding the tap to operative condition upon withdrawal of the tap from the work, a second abutment mounted on the inner chuck shaft bearing of the lathe and including a vertically movable abutment member positionable in lowered position for engaging the actuator and collapsing the tap upon completion of the tapping operation, and means operatively connecting the tool holder and the second-named abutment member for permitting the latter to lower to operative position as the tap enters the work and for elevating said second-named abutment member to an out-of-the-way position upon completion of the tapping operation.

2. In combination with a lathe having a rotary power-driven chuck unit and provided with a tool holder mounting a collapsible tap having an external actuator, said tool holder being fed to enter the tap in the work and then withdraw the tap from the work, an abutment fixed on the bed of the lathe in position to engage and shift the actuator for expanding the tap to operative condition upon withdrawal of the tap from the work, a vertically movable arm mounted on a chuck shaft bearing of the lathe and carrying a second abutment member, a pivoted lever operable for elevating said arm and the abutment member carried thereby, and means operatively connecting said lever with said tool holder whereby said arm and its abutment member are elevated to an out-of-the-way position upon withdrawal of the tap from the work, so as to permit ready removal of the work from the chuck unit.

3. In combination with a lathe having a rotary power-driven chuck unit and provided with a tool holder mounting a collapsible tap having an external actuator, said tool holder being fed to enter the tap in the work and then withdraw the tap from the work, an abutment fixed on the bed of the lathe in position to engage and shift the actuator for expanding the tap to operative condition upon withdrawal of the tap from the work, a vertically movable arm mounted on a chuck shaft bearing of the lathe and carrying a second abutment member, a pivoted lever operable for elevating said arm and the abutment member carried thereby, and means operatively connecting said lever with said tool holder whereby said arm and its abutment member are elevated to an out-of-the-way position upon withdrawal of the tap from the work, so as to permit ready removal of the work from the chuck unit, and yieldable means for swinging the lever downwardly to permit lowering of the arm and operative positioning of the second abutment member when the tap is fed to the work, said second abutment member being positioned when lowered to operative position so as to shift the actuator and collapse the tap upon completion of the threading operation.

4. In combination with a lathe having a rotary power-driven chuck unit and provided with a tool holder mounting a collapsible tap having an external actuator, said tool holder being fed to enter the tap in the work and then withdraw the tap from the work, an abutment fixed on the bed of the lathe in position to engage and shift the actuator for expanding the tap to operative condition upon withdrawal of the tap from the work, a vertically movable arm mounted on a chuck shaft bearing of the lathe and carrying a second abutment member, a pivoted lever operable for elevating said arm and the abutment member carried thereby, and means operatively connecting said lever with said tool holder whereby said arm and its abutment member are elevated to an out-of-the-way position upon withdrawal of the tap from the work, so as to permit ready removal of the work from the chuck unit, and means to adjust the second abutment member in a direction parallel with the movement of the tap, whereby the time of collapsing the tap may be adjusted as predetermined by the depth at which the tap is adapted to enter the work to complete the threading operation.

5. In combination with a lathe having a power-driven rotary chuck unit and provided with a tool holder mounting a collapsible tap having an actuator and fed to and from the chuck unit for entering the tap into and withdrawing the tap from the work, an abutment mounted on the lathe and disposed in the path of the tap actuator for expanding the tap to operative condition upon withdrawal of the tap from the work, a second abutment mounted on the lathe and including a vertically movable abutment member positionable in lowered operative position for engaging the tap actuator and collapsing the tap upon completion of the tapping operation, and means operatively connecting the tool holder and the second-named abutment member for permitting the latter to lower to operative position as the tap enters the work and for elevating said second-named abutment member to an out-of-the-way inoperative position upon completion of the tapping operation.

RUDOLPH A. LAVOTA.